US010685182B2

(12) United States Patent
Ashrafi et al.

(10) Patent No.: US 10,685,182 B2
(45) Date of Patent: Jun. 16, 2020

(54) IDENTIFYING NOVEL INFORMATION

(71) Applicant: Intel Corporation, Santa Clara, CA (US)

(72) Inventors: Ali Ashrafi, Chapel Hills, NC (US); Chetan Patel, Cary, NC (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 15/425,670

(22) Filed: Feb. 6, 2017

(65) Prior Publication Data

US 2018/0225582 A1    Aug. 9, 2018

(51) Int. Cl.
*G06F 40/30* (2020.01)
*G06Q 30/02* (2012.01)
*G06N 5/04* (2006.01)
*G06F 16/00* (2019.01)
*G06F 16/35* (2019.01)

(52) U.S. Cl.
CPC .............. *G06F 40/30* (2020.01); *G06F 16/00* (2019.01); *G06F 16/353* (2019.01); *G06N 5/04* (2013.01); *G06Q 30/0251* (2013.01)

(58) Field of Classification Search
CPC .............................. G06F 17/2785; G06N 5/04
See application file for complete search history.

(56) References Cited

U.S. PATENT DOCUMENTS

| | | | |
|---|---|---|---|
| 7,333,917 B2 | 2/2008 | Greis et al. | |
| 7,774,291 B2 | 8/2010 | Fleming et al. | |
| 8,566,360 B2 | 10/2013 | Chen | |
| 2008/0010272 A1* | 1/2008 | Schickel-Zuber | .... G06F 16/367 |
| 2011/0295903 A1* | 12/2011 | Chen | ..................... G06F 16/367 707/794 |
| 2012/0066072 A1* | 3/2012 | Kanigsberg | ............ G06Q 30/02 705/14.66 |
| 2012/0158527 A1 | 6/2012 | Cannelongo | |
| 2013/0110496 A1* | 5/2013 | Heidasch | ............ G06F 17/2795 704/9 |
| 2015/0066952 A1* | 3/2015 | Tavakkol | .............. G06F 16/335 707/748 |
| 2015/0339578 A1* | 11/2015 | Oliveira | ............. H04N 21/4314 706/11 |

OTHER PUBLICATIONS

Gabrilovich et al, "Newsjunkie: providing personalized newsfeeds via analysis of information novelty", 2004, Proceedings of the 13th international conference on World Wide Web, pp. 482-490. (Year: 2004).*

(Continued)

*Primary Examiner* — Alexey Shmatov
*Assistant Examiner* — Clint Mullinax
(74) *Attorney, Agent, or Firm* — Schwegman Lundberg & Woessner, P.A.

(57) ABSTRACT

System and techniques for identifying novel information are described herein. A classified experience may be obtained. The classified experience may include a set of attributes. Memory counts of members of the set of attributes for a user may be obtained. A novelty score for the classified experience may be computed by comparing the set of attributes to the memory counts. The classified experience may be presented to the user when the novelty score meets a qualification criterion.

24 Claims, 5 Drawing Sheets

(56) References Cited

OTHER PUBLICATIONS

Zhang et al "Computation on sentence semantic distance for novelty detection", 2005, Journal of Computer Science and Technology, 20 (3), pp. 331-337. (Year: 2005).*

Nakatsuji et al, "Classical music for rock fans?: Novel recommendations for expanding user interests", 2010, Proceedings of the 19th ACM international conference on Information and knowledge management, pp. 949-958. (Year: 2010).*

Seig et al, "Improving the effectiveness of collaborative recommendation with ontology-based user profiles", 2010, Proceedings of the 1st International workshop on Information Heterogeneity and Fusion in Recommender Systems, pp. 39-46. (Year: 2010).*

\* cited by examiner

IDENTIFYING NOVEL INFORMATION

TECHNICAL FIELD

Embodiments described herein generally relate to artificial intelligence and more specifically to identifying novel information.

BACKGROUND

An aspect of modern artificial intelligence systems includes machine filtering of materials for human consumption. This may take the form of search engines, recommender systems—such as may be used to recommend a movie, book, article, etc.—or the like. More sophisticated approaches involve techniques that look for similarities between that which a user has previously consumed or has indicated a desire to consume more of. Semantic analysis may be used to assess similarities between consumables that are not readily apparent on the surface. For example, two films may have a similar plot, artistic direction, or acting, and thus be semantically similar, all the while including different writers, directors, or actors. Thus, to a naïve comparison (e.g., matching meta data entities), these films are different while being, in fact, similar.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

True personalized novelty detection is missing from existing cognitive solutions. Often, the terms "anomaly" and "novelty" are confounded. Whereas an anomaly is defined as the difference between an actual value and its expected value, novelty is defined as a purer uncertainty of "newness" for which there is no expectation from which to deviate (e.g., not having any knowledge of something in the first place). Novelty, like anomaly, is also the complement of classification because classification predicts a result for a given input based on what has been previously observed. Novelty, in contrast, measures the newness of what has not yet been observed. Novelty, therefore, is not self-reinforcing but rather serves to drive new learning that may then be used to expand classification in the future.

To identify novel information, what a target entity, such as a user, already knows, or has been exposed to, is taken into account. Specifically, a representation for previous experiences, as measured by the system, are recorded; herein, these records are referred to as "memories" even though they reside in the system and not in a human mind. An aspect of storing the memories includes identifying co-occurrence of attributes in memories. For example, a suite of classifiers may be applied to a group of news articles. One classifier may identify that a subject of the articles is an actor, another classifier may identify that some articles are about a divorce while others are about the birth of a child, etc. As the results of the classifiers occur together in the different news articles, the memories may include a count of this co-occurrence. Thus, the memory system may track both the memory, the classifications (e.g., attributes) of the memory, and the co-occurrence of classifications. These data are leveraged to determine what is new and thus identify novel information for a user.

Newness, in the context of memories, may be defined as a new attribute (e.g., something never before experienced by the user), a new co-occurrence of known attributes—e.g., between two attributes, both are included in previous memories but they did not previously occur in the same consumable, or a combination of the two. Further, a degree of newness may be calculated from these factors, such that attributes which frequently co-occur may be considered less new that attributes that infrequently co-occur.

User experiences may be collected as memories. Here, the memories refer to a machine proxy for what may be an actual memory of the user. The proxy stores information about user experiences, such as tasks (e.g., sporting activity, meeting, etc.), media (e.g., documents, films, etc.), assuming that this information will be similarly retained by the user. When new data arrives that contains a new node that is highly connected to the user's interest nodes, this node is also of likely interest to grow the user's knowledge. Likewise, when the user's memory contains two nodes that have never been associated before in the user's experience and the new data provides evidence of the association, this new link is likely of interest for the user to fill-in her personal knowledge graph.

Suppose new data (e.g., consumable) containing a new node (e.g., attribute) that is highly connected to the user's interest nodes—attributes for which the user has specified, or that have been identified by the system to be, interesting or relevant to the user—arrives. This node is likely to grow the user's knowledge. For example, a new "bad guy" or competitor may enter the market. The user may be unaware of this occurrence but would likely want to know about it.

Similarly, when the user's memory contains two nodes that have never been (or rarely) associated before in the user's experience and the new data provides evidence of the association, this new link is likely of interest to the user by filling-in the user's personal knowledge graph. For example, two known bad guys may meet for the first time or a known competitor may initiate a new relationship with a current supplier; a competitive intelligence analyst may want to know about this development over, for example, other reports of the competitors' activities.

Broadly, the described systems and techniques identify missing nodes and missing links in a user's personal knowledge graph to help grow the user's knowledge. Example uses may include driving a user's "offline" education or modifying a user's workflow.

The systems and techniques described herein are superior to existing recommender systems, for example, because recommender systems generally are limited to particular domains and often ignore novelty, simply providing results that closely match that which the user has already experienced (e.g., seen). By using attributes of memories, the present systems and techniques are generic as to subject matter—having applicability to any subject domain ranging from finance to healthcare to business intelligence, and able to use or classify the novelty of any type of data, whether the data is unstructured, semi-structured, or structured—and measures how new a relevant consumable is rather than how familiar.

The described systems and techniques for identifying novel information are better than existing solutions because they personalize the novelty of the information to the user's personal memory. In traditional systems, even if the material is relevant, it is uninformative to the user that already knows about the material. Novelty drives discovery of what is not yet known. The systems and techniques described herein avoid the "narcissism" of recommending the same material over and over again inherent in other systems.

Figure 1:
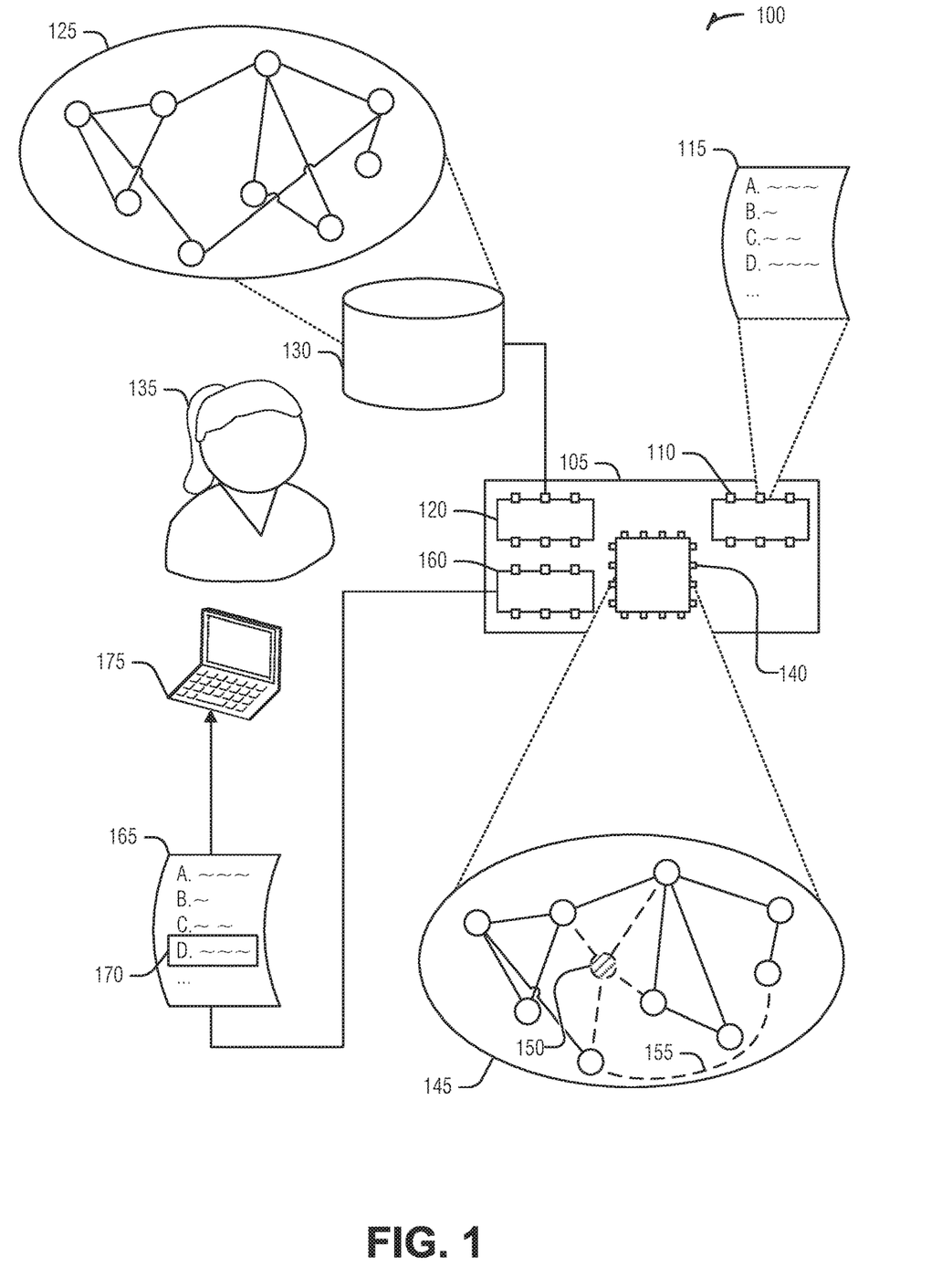
FIG. 1 illustrates an environment including a system for identifying novel information, according to an embodiment.

FIG. 1 illustrates an environment 100 including a system 105 for identifying novel information, according to an embodiment. The system 105 includes a first transceiver 110, a second transceiver 120, a third transceiver 160, and a controller 140. All of these components are implemented in electronic hardware, such as that described below with respect to FIG. 6 (e.g., circuits). In an example, one or more of the first transceiver 110, the second transceiver 120, or the third transceiver 160 may be implemented by the same hardware.

The first transceiver 110 (e.g., a network adapter, storage controller, etc.) is arranged to obtain (e.g., retrieve or receive) a classified experience 115. The classified experience 115 has been subject to one or more classifiers to produce a signature set of attributes, such as the illustrated attributed A, B, C. D, and E. Thus, the classified experience 115 includes a set of attributes. The classifiers may be artificial neural networks, semantic analysis engines (e.g., performing latent semantic analysis (LSA), semantic hashing, latent semantic indexing (LSI), or other natural language processing (NLP techniques), or even keyword matching engines.

In an example, obtaining the classified experience 115 may include receiving the classified experience 115 from an external source, such as a news feed, information delivery service, etc. In an example, obtaining the classified experience 115 may include the controller 140 directing the first transceiver 110 to retrieve the classified experience 115 from an external source, such as a website or database. Example classified experiences may include news articles, blog posts, applications, study, proposal, report, etc. In an example, the controller 140 performs the classification on an experience (e.g., consumable such as a document, article, data set, etc.) to produce the classified experience 115 from an experience obtained by the first transceiver.

The second transceiver 120 (e.g., a network adapter, a storage controller, etc.) is arranged to obtain memory counts 125 (e.g., nodes and links of the user's knowledge graph, memory occurrence counts, co-occurrences, etc.,) of members of the set of attributes for a user 135. The memory counts may be stored on a local storage device 130, or stored remotely. As noted above, memories are records of probable experiences of the user 135, as determined by the system 105, or one or more other devices. A memory may, for example, be created when a user opens an electronic book, the assumption being that the user 135 read, and thus experienced, the book. A variety of databases support memory recordation, such as the Saffron MemoryBase product that employs an associative memory allowing for a range of novelty computations that may take into account statistics as well as semantics The controller 140 is arranged to compute a novelty score for the classified experience 115 by comparing the set of attributes to the memory counts 125. As illustrated, the result of the comparing 145 illustrated a novel node 150 with corresponding new links (dashed lines connecting node 150 to other nodes) as well as a novel link 155 between already known nodes. It is these novel aspects of the classified experience 115 that will form the basis for the novelty score computed from by the controller 140.

In an example, comparing the set of attributes to the memory counts 125 includes identifying attributes in the set of attributes for which there is no corresponding memory score. This example demonstrates a new, or novel, attribute. In an example, the novelty score is a function of a number of attributes in the set of attributes for which there is a corresponding memory count. This example links the novelty of the unknown attribute to the novelty of the known attributes. Thus, in an example, the greater the number of known attributes in the classified experience 115, the less novel the new attribute is when considering the novelty of the classified experience.

Figure 4:
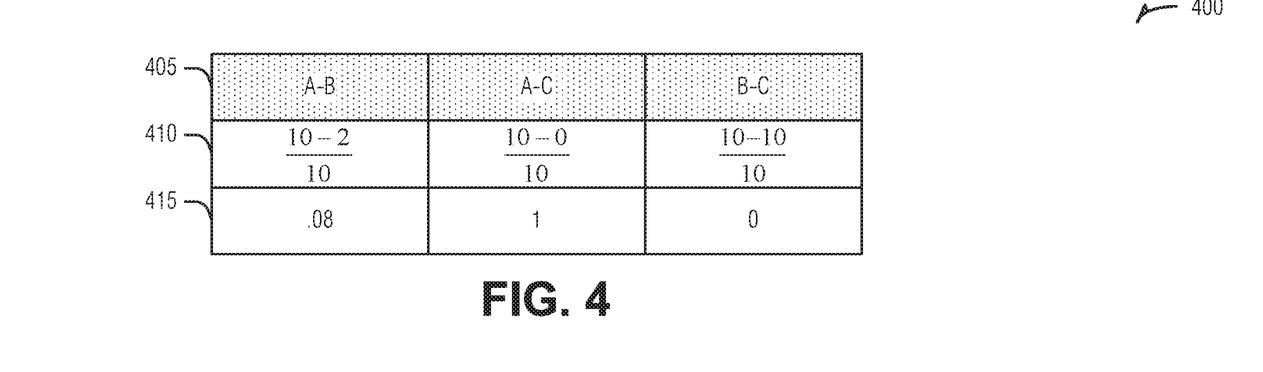
FIG. 4 is a table of link novelty, according to an embodiment.

In an example, comparing the set of attributes to the memory counts 125 includes scoring the novelty of links between attributes. In an example, a link between attributes is a co-occurrence of attributes across classified experiences for the user and the memory counts store co-occurrences between attributes. In an example, novelty of a link from the set of attributes to the memory counts 125 is computed by subtracting a first co-occurrence from a second co-occurrence and dividing the result by the second co-occurrence. Here, the second co-occurrence is an attribute with a largest value in the memory counts 125 and the first co-occurrence is a value indicating co-occurrence between another attribute and the attribute with the largest value in the memory counts 125. The discussion below with respect to FIG. 4 provides additional details for this example.

In an example, the novelty score includes multiplying fully novel links by a cardinality of the set of attributes to produce a first result and adding the first result to a sum of memory counts 125 to produce a second result. The second result is then divided by a maximum possible novelty score. This example provides an overall novelty score, based on links, for the classified experience 115. The discussion below with respect to FIG. 4 provides additional details for this example.

In an example, the controller 140 is arranged to identify the user 135 from a set of users using the set of attributes. In an example, identifying the user 135 includes obtaining an interest profile for the user 135, for example, from the local storage device 130, or a remote data store. In an example, the interest profile includes a set of topics. Here, a topic in the set of topics includes an attribute and, in an example, a level of interest in the attribute.

The controller 140 is arranged to sort the set of users based on the level of interest in attributes contained in the set of attributes. The controller 140 may then select users with a level of interest beyond a threshold. In an example, selecting the users with a level of interest beyond the threshold includes adding an interest level for each attribute in the set of attributes and comparing the result to the threshold. In an example, selecting the users with the level of interest beyond the threshold includes excluding users that have a level of interest in only one attribute.

In an example, the third transceiver 160 is arranged to present the classified experience 115 to the user 135 (e.g., via a device 175) when the novelty score meets a qualification criterion. The qualification criterion may include a novelty threshold, a number of consumables desired by the user where the novelty score permits ranking of consumables such that the desired number of most novel consumables are presented, etc. In an example, presenting the classified experience includes the controller 140 providing a synopsis 165 of novel elements 170 of the experience 115 with respect to the user 135. As is evident, because the novelty is specific to the user 135, the novel elements 170 may also be specific to the user 135, with the synopsis varying between different users.

Figure 2:
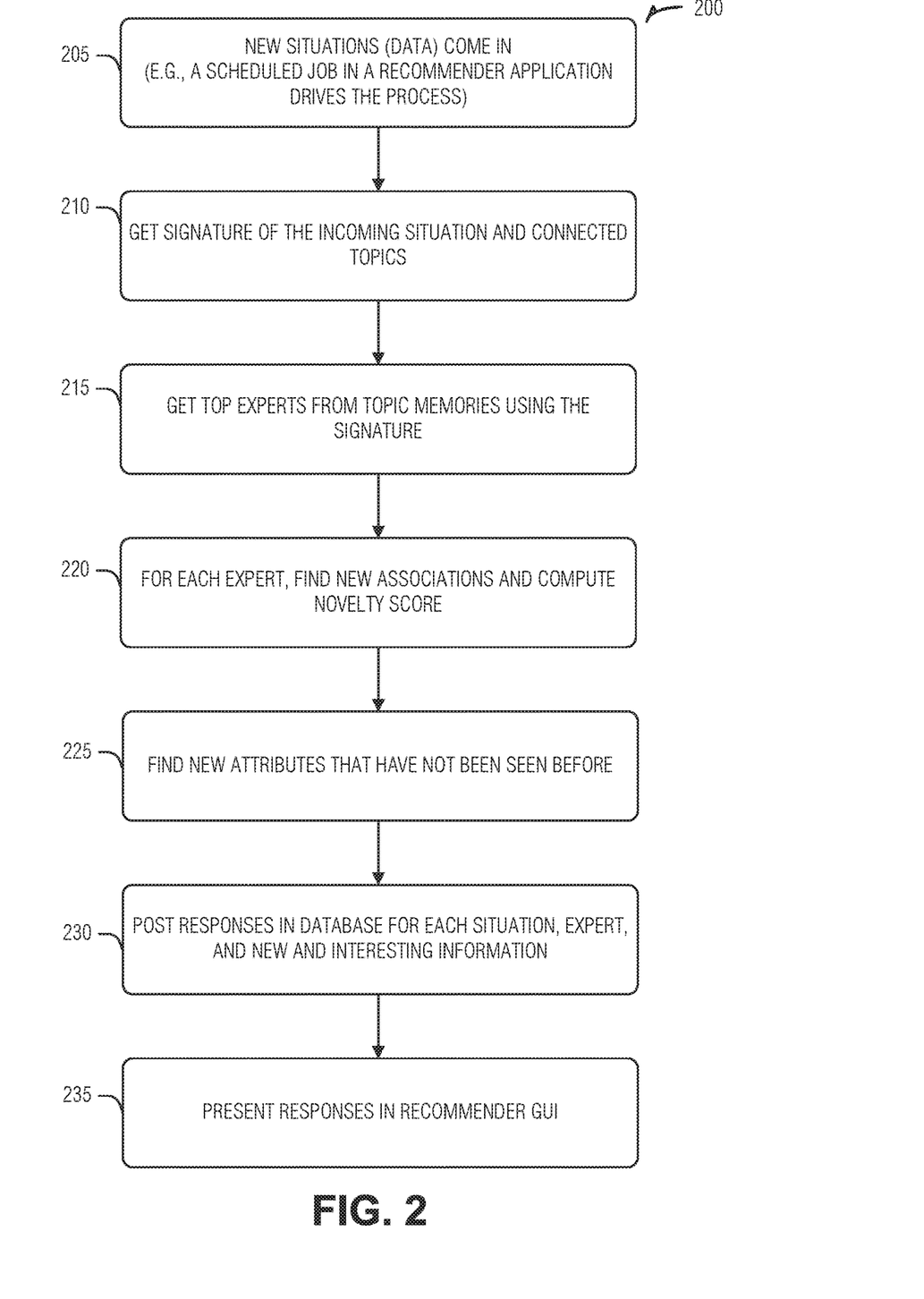
FIG. 2 is a flowchart of an example of a workflow for a recommender of novel information, according to an embodiment.

FIG. 2 is a flowchart of an example of a workflow 200 for a recommender of novel information, according to an embodiment. The workflow 200 may be implemented by the electronic hardware discussed above, or below with respect to FIG. 6 (e.g., circuits). The workflow 200 may be called a "new and interesting recommender."

The workflow 200 starts by accepting a new situation (e.g., consumable, experience, data, etc.) (operation 205). The new situation is classified to produce a signature of the new situation and connected topics (operation 210). The workflow continues by finding (e.g., identifying, locating, etc.) a set of relevant or interested users to a new situation (operation 215). The set of interested users (e.g., experts, knowledge-workers, etc.) may be found in several ways. For example, users may be targeted whose known interest (e.g., main topic, expertise, etc. as identified by the user or inferred from information about the user such as employment or education history, consumption habits, etc.) is directly tied to the new situation or closely related to it.

In another example, the intersection of topics and interests produces the relevant set of users. For example, if the new situation is related to topic "a" and topic "b," in this approach, user X, who has interests in both "a" and "b," is ranked as having a higher interest in the new situation than user Y whose interest is solely in topic "a" even if user Y has more interest in topic "a" than user X.

Once the relevant users are identified the past and overall knowledge collection of a given identified user is used to compute the novelty for that user (operation 220). In an example, the novelty computation is based on an interest profile of the user. As noted above, no matter how much the incoming data is new and relevant to the interests of the user, it's not novel if the user already knows the information or has seen situations that are too similar.

The novelty score computation may identify attributes that are new to the user (operation 225). These new attributes may be recorded for the user, the situation, or may be used to extract the interesting (e.g., novel portions) of the situation and record them for later consumption (operation 230). At some point, the situation, if it is novel enough given the circumstances (e.g., as measured by a threshold selected based on observable factors such as user requests, time of day, etc.) are presented to the user in a graphical user interface (GUI) (operation 235).

The workflow 200 produces a personalized novelty identification for data that recommends "new and interesting" information. The signature of the new data is an indicator of the unique attributes that are used to gauge interest or connectivity to the user's personal memory. The signature set is processed to compute the novelty of new nodes and new links based on interested users' personal memories. Based on user novelty scores, personalized recommendations are made to each individual user.

Figure 3:
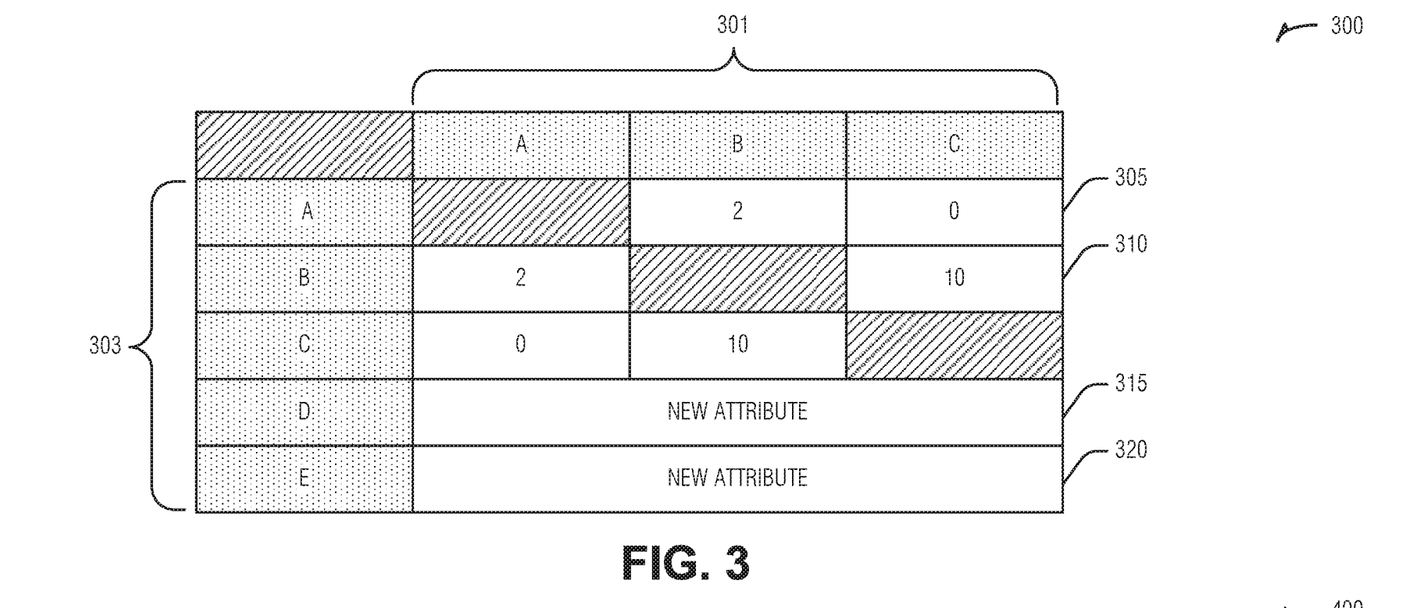
FIG. 3 is a table of memory co-occurrence counts, according to an embodiment.

FIG. 3 is a table 300 of memory correspondence counts, according to an embodiment. First, consider a new incoming consumable that has a signature set of 5 attributes: A B C D and E 303. The signature set may be used to identify user's interested in the consumable by, for example, the presence of an attribute and a measure of interest the user has in the attribute. Top users—e.g., a threshold number of users sorted based on interest in one or more attributes of the signature set—are selected for novelty analysis with respect to the consumable. By first selecting interested users, the problem of recommending "new" things of no interest to the user is avoid. For example, a vegetarian is unlikely to consume meatloaf recipes, and thus will probably have few memories with signature sets for meatloaf recipes. Thus, meatloaf recipes may be novel to the user, and yet of no interest to the user.

Once interested users are selected, quantifying the novelty of the consumable to each user may begin. This process starts by retrieving topic memories of the user using the signature set. The topic memories include attributes already known to the user 301 from the signature set 303, and memory correspondence counts. As illustrated the intersection of the topic memory and signature set for two given attributes indicates the co-occurrence of the attributes in the user's past (e.g., not including the new consumable). Thus, for example, cell 305 indicates that the user has yet to see attribute A and attribute C appear together, cell 310 indicates that the user has experienced attributes B and C ten times before, and cells 315 and 320 indicates that the user has yet to experience attributes D and E.

Measuring the novelty of new nodes (e.g., attributes D and E) may be determining whether or not the user have seen the attribute previously. Thus, the measure of novelty is simple a yes, the attribute is novel, or no, the attribute is not novel. In an example, the novelty of new nodes may be measured as a ratio between the number of new nodes and the total number of nodes in the signature set. Thus, in the illustrated example, the novelty measure for both D and E is ⅖ because there are two unknown nodes out of five total nodes.

New links (e.g., associations between already known nodes) may also be simply counted (e.g., a link is either known or it is not). However, in practice, a number of statistical measures of the newness of the link may be employed. FIG. 4 illustrates one such example.

FIG. 4 is a table 400 of link novelty, according to an embodiment. FIG. 4 illustrates a novelty calculation for three links 405. A↔B. A↔C. and B↔C. The novelty of a given link is given by the ratio of the greatest number of co-occurrences between attributes in the memory correspondence counts and the difference between this number and the correspondence count for the link. For the numbers given in FIG. 3, row 410 illustrates this ratio. The following formula provides a more formal definition of row 410:

$$S_{i,j}^{link} = \frac{\max(c_{i,j}) - c_{i,j}}{\max(c_{i,j})}$$

where i and j represent two attributes, c represents the association count, and S is the novelty score of the link between i and j. In the example illustrated in FIG. 4, row 415 provides the respective novelty scores for the various links. Here, the A↔C link is fully novel because the resultant novelty score is one—meaning that the particular association of A and C (with a count of 0) has never been seen prior to this consumable by the user. Also note, that this technique inevitably provides a foil by which at least one link will have no novelty (e.g., a novelty score of zero), as demonstrated in the association B↔C.

While ascertaining the novelty of any given link given the new consumable is interesting, combining the novelty of the links may provide more insight into how novel the entire consumable is for the user. This is here referred to as an overall novelty score. In an example, the overall novelty score is applied to the new consumable to determine whether or not to recommend the consumable, or as a score by which to rank the new consumable with other consumables.

In an example, the overall novelty score may be computed as follows:

$$S^{link} = \frac{nS_{new}^{link} + \sum_{i,j=0;i>j}^{n-1} S_{i,j}^{link}}{S_{max}} \text{ where:}$$

$S^{link}$ is the overall novelty score $n$ is the number of attributes in the situation (e.g., new aricle, etc)

$S_{new}^{link}$ is the number of fully novel (e.g., novelty of 1) links $\sum_{i,j=0;i>j}^{n-1} S_{i,j}^{link}$ is the sum of novelty scores for each link in the situation, where:

$n - 1$ represents the max row/column index in the matrix (e.g., illustrated in FIG. 3).

$i, j$ represents the memory matrix coordinates (e.g., illustrated in FIG. 3).

$i > j$ limits the sum of single cell novelty score to the lower half of the matrix(e.g., below and to the left of the shaded diagnol in FIG. 3).

$S_{max}$ is the maximum possible novelty score.

This is equal to $\frac{(n^3 - n)}{2}$

The computation of the overall novelty score within the example illustrated in FIG. 4, produces the following result (where n=5):

$$\frac{(5*1) + (0.8 + 1 + 0)}{\left(\frac{125 - 5}{2}\right)} = \frac{6.8}{60} = 0.1$$

Figure 5:
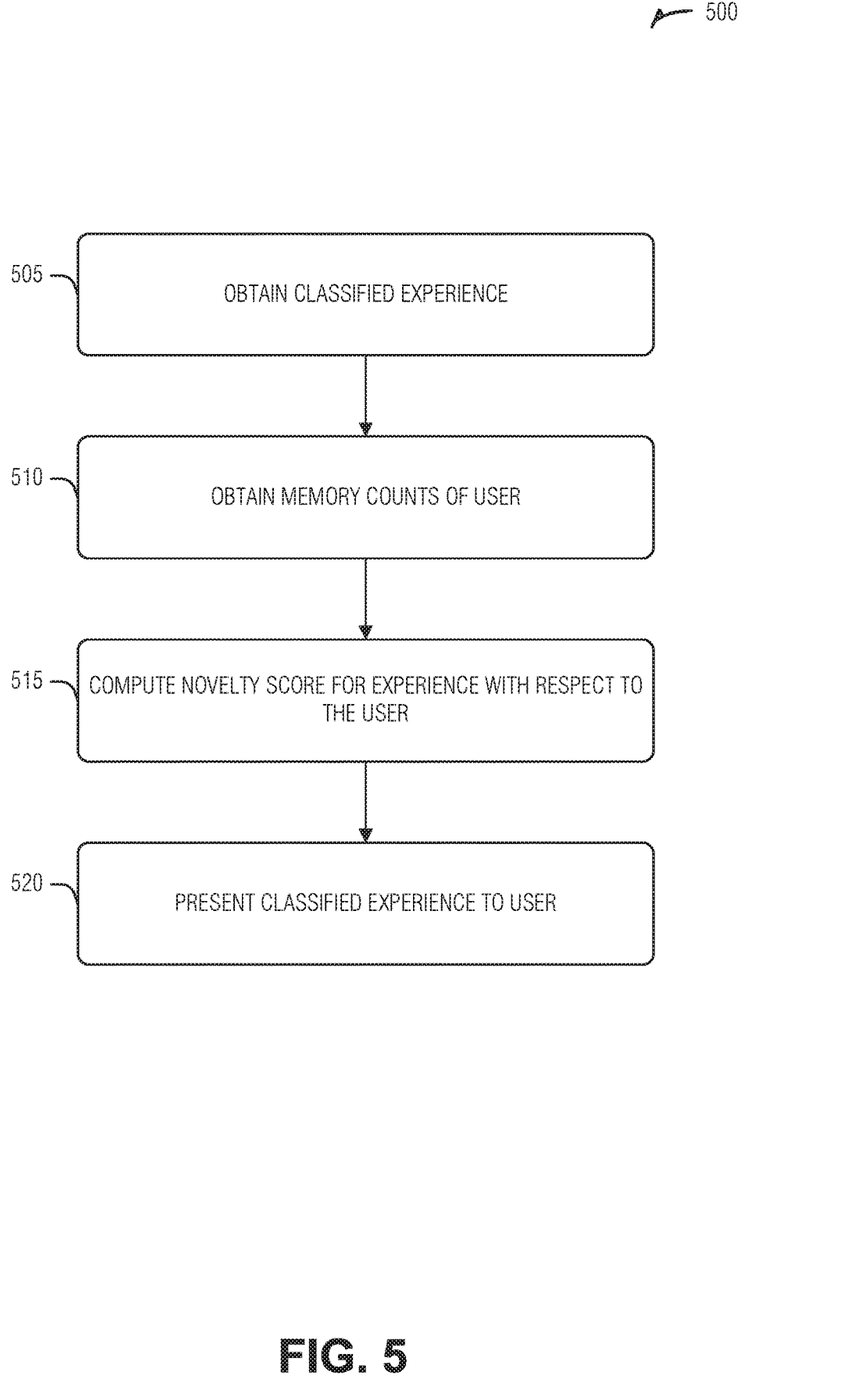
FIG. 5 is a flowchart of an example of a method for identifying novel information, according to an embodiment.

FIG. 5 is a flowchart of an example of a method 500 for identifying novel information, according to an embodiment. The operations of the method 500 are performed by electronic hardware, such as that described above, or below with respect to FIG. 6 (e.g., circuits).

At operation 505, a classified experience is obtained. In an example, classified experience includes a set of attributes.

At operation 510, memory counts of members of the set of attributes for a user are obtained.

At operation 515, a novelty score is computed for the classified experience by comparing the set of attributes to the memory counts. In an example, comparing the set of attributes to the memory counts includes identifying attributes in the set of attributes for which there is no corresponding memory score. In an example, the novelty score is a function of a number of attributes in the set of attributes for which there is a corresponding memory count.

In an example, comparing the set of attributes to the memory counts includes scoring the novelty of links between attributes. In an example, a link between attributes is a co-occurrence of attributes across classified experiences for the user. In an example, the memory counts storing co-occurrences between attributes. In an example, a novelty of a link from the set of attributes to the memory counts is computed by subtracting a first co-occurrence from a second co-occurrence and dividing the result by the second co-occurrence. In this example, the second co-occurrence is an attribute with a largest value in the memory counts and the first co-occurrence is a value indicating co-occurrence between another attribute and the attribute with the largest value in the memory counts.

In an example, the novelty score includes multiplying fully novel links by a cardinality of the set of attributes to produce a first result, adding the first result to a sum of memory counts to produce a second result, and dividing the second result by a maximum possible novelty score.

At operation 520, the classified experience is presented to the user when the novelty score meets a qualification criterion. In an example, presenting the classified experience includes providing a synopsis of novel elements of the experience with respect to the user.

In an example, the method 500 may be extended to include identifying the user from a set of users using the set of attributes. In an example, identifying the user includes obtaining an interest profile for the user—where the interest profile including a set of topics and a topic in the set of topics includes an attribute and a level of interest in the attribute—sorting the set of users based on the level of interest in attributes contained in the set of attributes, and selecting users with a level of interest beyond a threshold. In an example, In an example, selecting the users with a level of interest beyond the threshold includes adding an interest level for each attribute in the set of attributes. In an example, selecting the users with the level of interest beyond the threshold includes excluding users that have a level of interest in only one attribute.

Figure 6:
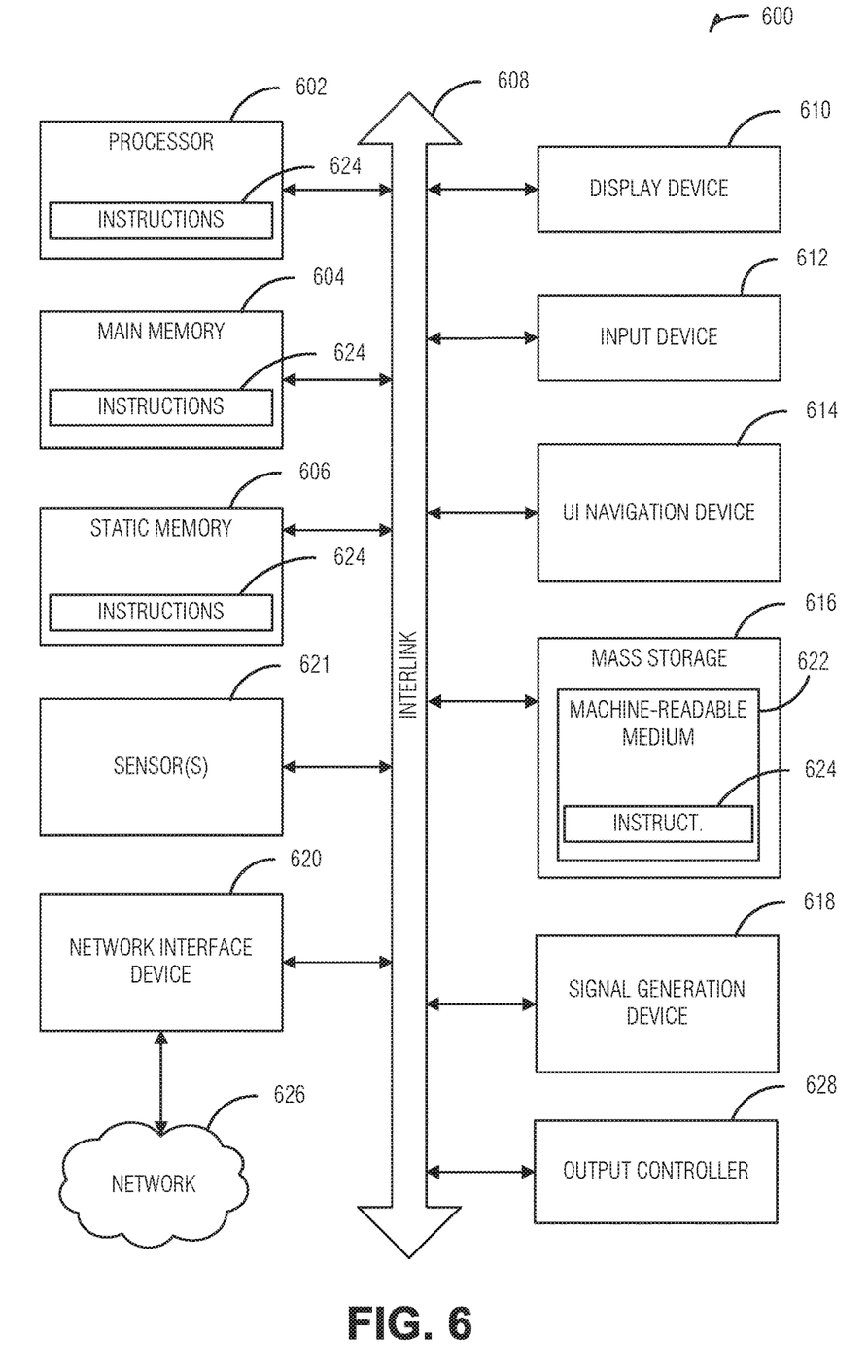
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 is a system for identifying novel information, the system comprising: a first transceiver to obtain a classified experience, the classified experience including a set of attributes; a second transceiver to obtain memory counts of members of the set of attributes for a user; a controller to compute a novelty score for the classified experience via a comparison of the set of attributes to the memory counts; and a third transceiver to present the classified experience to the user when the novelty score meets a qualification criterion.

In Example 2, the subject matter of Example 1 optionally includes wherein the comparison of the set of attributes to the memory counts includes an identification of attributes in the set of attributes for which there is no corresponding memory score.

In Example 3, the subject matter of Example 2 optionally includes wherein the novelty score is a function of a number of attributes in the set of attributes for which there is a corresponding memory count.

In Example 4, the subject matter of any one or more of Examples 1-3 optionally include wherein the comparison of the set of attributes to the memory counts includes a score of the novelty of links between attributes.

In Example 5, the subject matter of Example 4 optionally includes wherein a link between attributes is a co-occurrence of attributes across classified experiences for the user, the memory counts representative of co-occurrences between attributes.

In Example 6, the subject matter of Example 5 optionally includes wherein a novelty of a link from the set of attributes to the memory counts is computed by a subtraction of a first co-occurrence from a second co-occurrence and a division of the result by the second co-occurrence, where the second co-occurrence is an attribute with a largest value in the memory counts and the first co-occurrence is a value that indicates co-occurrence between another attribute and the attribute with the largest value in the memory counts.

In Example 7, the subject matter of any one or more of Examples 1-6 optionally include wherein the novelty score is computed via: a multiplication of fully novel links by a cardinality of the set of attributes to produce a first result; an addition of the first result to a sum of memory counts to produce a second result; and a division of the second result by a maximum possible novelty score.

In Example 8, the subject matter of any one or more of Examples 1-7 optionally include wherein the controller is to identify the user from a set of users that use the set of attributes.

In Example 9, the subject matter of Example 8 optionally includes wherein, to identify the user, the controller is to: obtain an interest profile for the user, the interest profile including a set of topics, a topic in the set of topics including an attribute and a level of interest in the attribute; sort the set of users based on the level of interest in attributes contained in the set of attributes; and select users with a level of interest beyond a threshold.

In Example 10, the subject matter of Example 9 optionally includes wherein, to select the users with a level of interest beyond the threshold, the controller is to add an interest level for each attribute in the set of attributes.

In Example 11, the subject matter of any one or more of Examples 9-10 optionally include wherein, to select the users with a level of interest beyond the threshold, the controller is to exclude users that have a level of interest in only one attribute.

In Example 12, the subject matter of any one or more of Examples 1-11 optionally include wherein, to present the classified experience, the controller is to provide a synopsis of novel elements of the experience with respect to the user.

In Example 13, the subject matter of any one or more of Examples 1-12 optionally include wherein the first transceiver, the second transceiver, and the third transceiver are implemented in the same hardware.

Example 14 is a method for identifying novel information, the method comprising: obtaining a classified experience, the classified experience including a set of attributes; obtaining memory counts of members of the set of attributes for a user; computing a novelty score for the classified experience by comparing the set of attributes to the memory counts; and presenting the classified experience to the user when the novelty score meets a qualification criterion.

In Example 15, the subject matter of Example 14 optionally includes wherein comparing the set of attributes to the memory counts includes identifying attributes in the set of attributes for which there is no corresponding memory score.

In Example 16, the subject matter of Example 15 optionally includes wherein the novelty score is a function of a number of attributes in the set of attributes for which there is a corresponding memory count.

In Example 17, the subject matter of any one or more of Examples 14-16 optionally include wherein comparing the set of attributes to the memory counts includes scoring the novelty of links between attributes.

In Example 18, the subject matter of Example 17 optionally includes wherein a link between attributes is a co-occurrence of attributes across classified experiences for the user, the memory counts storing co-occurrences between attributes.

In Example 19, the subject matter of Example 18 optionally includes wherein a novelty of a link from the set of attributes to the memory counts is computed by subtracting a first co-occurrence from a second co-occurrence and dividing the result by the second co-occurrence, where the second co-occurrence is an attribute with a largest value in the memory counts and the first co-occurrence is a value indicating co-occurrence between another attribute and the attribute with the largest value in the memory counts.

In Example 20, the subject matter of any one or more of Examples 14-19 optionally include wherein the novelty score is computed by: multiplying fully novel links by a cardinality of the set of attributes to produce a first result; adding the first result to a sum of memory counts to produce a second result; and dividing the second result by a maximum possible novelty score.

In Example 21, the subject matter of any one or more of Examples 14-20 optionally include identifying the user from a set of users using the set of attributes.

In Example 22, the subject matter of Example 21 optionally includes wherein identifying the user includes: obtaining an interest profile for the user, the interest profile including a set of topics, a topic in the set of topics including an attribute and a level of interest in the attribute; sorting the set of users based on the level of interest in attributes contained in the set of attributes; and selecting users with a level of interest beyond a threshold.

In Example 23, the subject matter of Example 22 optionally includes wherein selecting the users with a level of interest beyond the threshold includes adding an interest level for each attribute in the set of attributes.

In Example 24, the subject matter of any one or more of Examples 22-23 optionally include wherein selecting the users with the level of interest beyond the threshold includes excluding users that have a level of interest in only one attribute.

In Example 25, the subject matter of any one or more of Examples 14-24 optionally include wherein presenting the classified experience includes providing a synopsis of novel elements of the experience with respect to the user.

Example 26 is at least one machine readable medium including instructions that, when executed by a machine, cause the machine to perform any of methods 14-25.

Example 27 is a system comprising means to perform any of methods 14-25.

Example 28 is at least one machine readable medium including instructions for identifying novel information, the instructions, when executed by processing circuitry, cause the processing circuitry to perform operations comprising: obtaining a classified experience, the classified experience including a set of attributes; obtaining memory counts of members of the set of attributes for a user; computing a novelty score for the classified experience by comparing the set of attributes to the memory counts; and presenting the classified experience to the user when the novelty score meets a qualification criterion.

In Example 29, the subject matter of Example 28 optionally includes wherein comparing the set of attributes to the memory counts includes identifying attributes in the set of attributes for which there is no corresponding memory score.

In Example 30, the subject matter of Example 29 optionally includes wherein the novelty score is a function of a number of attributes in the set of attributes for which there is a corresponding memory count.

In Example 31, the subject matter of any one or more of Examples 28-30 optionally include wherein comparing the set of attributes to the memory counts includes scoring the novelty of links between attributes.

In Example 32, the subject matter of Example 31 optionally includes wherein a link between attributes is a co-occurrence of attributes across classified experiences for the user, the memory counts storing co-occurrences between attributes.

In Example 33, the subject matter of Example 32 optionally includes wherein a novelty of a link from the set of attributes to the memory counts is computed by subtracting a first co-occurrence from a second co-occurrence and dividing the result by the second co-occurrence, where the second co-occurrence is an attribute with a largest value in the memory counts and the first co-occurrence is a value indicating co-occurrence between another attribute and the attribute with the largest value in the memory counts.

In Example 34, the subject matter of any one or more of Examples 28-33 optionally include wherein the novelty score is computed by: multiplying fully novel links by a cardinality of the set of attributes to produce a first result; adding the first result to a sum of memory counts to produce a second result; and dividing the second result by a maximum possible novelty score.

In Example 35, the subject matter of any one or more of Examples 28-34 optionally include wherein the operations comprise identifying the user from a set of users using the set of attributes.

In Example 36, the subject matter of Example 35 optionally includes wherein identifying the user includes: obtaining an interest profile for the user, the interest profile including a set of topics, a topic in the set of topics including an attribute and a level of interest in the attribute; sorting the set of users based on the level of interest in attributes contained in the set of attributes; and selecting users with a level of interest beyond a threshold.

In Example 37, the subject matter of Example 36 optionally includes wherein selecting the users with a level of interest beyond the threshold includes adding an interest level for each attribute in the set of attributes.

In Example 38, the subject matter of any one or more of Examples 36-37 optionally include wherein selecting the users with the level of interest beyond the threshold includes excluding users that have a level of interest in only one attribute.

In Example 39, the subject matter of any one or more of Examples 28-38 optionally include wherein presenting the classified experience includes providing a synopsis of novel elements of the experience with respect to the user.

Example 40 is a system for identifying novel information, the system comprising: means for obtaining a classified experience, the classified experience including a set of attributes; means for obtaining memory counts of members of the set of attributes for a user; means for computing a novelty score for the classified experience by comparing the set of attributes to the memory counts; and means for presenting the classified experience to the user when the novelty score meets a qualification criterion.

In Example 41, the subject matter of Example 40 optionally includes wherein comparing the set of attributes to the memory counts includes identifying attributes in the set of attributes for which there is no corresponding memory score.

In Example 42, the subject matter of Example 41 optionally includes wherein the novelty score is a function of a number of attributes in the set of attributes for which there is a corresponding memory count.

In Example 43, the subject matter of any one or more of Examples 40-42 optionally include wherein comparing the set of attributes to the memory counts includes scoring the novelty of links between attributes.

In Example 44, the subject matter of Example 43 optionally includes wherein a link between attributes is a co-occurrence of attributes across classified experiences for the user, the memory counts storing co-occurrences between attributes.

In Example 45, the subject matter of Example 44 optionally includes wherein a novelty of a link from the set of attributes to the memory counts is computed by subtracting a first co-occurrence from a second co-occurrence and dividing the result by the second co-occurrence, where the second co-occurrence is an attribute with a largest value in the memory counts and the first co-occurrence is a value indicating co-occurrence between another attribute and the attribute with the largest value in the memory counts.

In Example 46, the subject matter of any one or more of Examples 40-45 optionally include wherein the novelty score is computed by: multiplying fully novel links by a cardinality of the set of attributes to produce a first result; adding the first result to a sum of memory counts to produce a second result; and dividing the second result by a maximum possible novelty score.

In Example 47, the subject matter of any one or more of Examples 40-46 optionally include means for identifying the user from a set of users using the set of attributes.

In Example 48, the subject matter of Example 47 optionally includes wherein the means for identifying the user include: means for obtaining an interest profile for the user, the interest profile including a set of topics, a topic in the set of topics including an attribute and a level of interest in the attribute; means for sorting the set of users based on the level of interest in attributes contained in the set of attributes; and means for selecting users with a level of interest beyond a threshold.

In Example 49, the subject matter of Example 48 optionally includes wherein the means for selecting the users with a level of interest beyond the threshold include means for adding an interest level for each attribute in the set of attributes.

In Example 50, the subject matter of any one or more of Examples 48-49 optionally include wherein the means for selecting the users with the level of interest beyond the threshold include means for excluding users that have a level of interest in only one attribute.

In Example 51, the subject matter of any one or more of Examples 40-50 optionally include wherein the means for presenting the classified experience include means for providing a synopsis of novel elements of the experience with respect to the user.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for identifying novel information, the system comprising:
    a first transceiver to obtain a classified experience, the classified experience including a set of attributes,
        wherein the experience is a machine proxy for a memory of a user, the experience comprising electronic information about a user experience,
        wherein attributes in the set of attributes are nodes in a graph representing knowledge of the user, links between attributes are co-occurrences of attributes across experiences for the user,
        wherein the set of attributes is determined by applying a classifier to the electronic information of the experience to produce the set of attributes, the classifier comprising at least one of an artificial neural network, a semantic analysis engine, semantic hashing, or latent semantic analysis;
    a second transceiver to obtain memory counts of members of the set of attributes for a user, wherein the memory counts are representative of co-occurrences between attributes;
    a controller to compute a novelty score for the classified experience via a comparison of the set of attributes to the memory counts,
        wherein the comparison of the set of attributes to the memory counts includes a score of a novelty of links between attributes, and wherein the novelty of a link from the set of attributes to the memory counts is computed by:
            a subtraction of a first co-occurrence from a second co-occurrences; and
            a division of the result by the second co-occurrence, where the second co-occurrence is an attribute with a largest value in the memory counts and the first co-occurrence is a value that indicates co-occurrence between another attribute and the attribute with the largest value in the memory counts; and
    a third transceiver to present the classified experience to the user when the novelty score meets a qualification criterion.

2. The system of claim 1, wherein the novelty score is computed via:
    a multiplication of fully novel links by a cardinality of the set of attributes to produce a first result;
    an addition of the first result to a sum of memory counts to produce a second result; and
    a division of the second result by a maximum possible novelty score.

3. The system of claim 1, wherein the controller is to identify the user from a set of users that use the set of attributes.

4. The system of claim 1, wherein, to present the classified experience, the controller is to provide a synopsis of novel elements of the experience with respect to the user.

5. The system of claim 1, wherein the first transceiver, the second transceiver, and the third transceiver are implemented in the same hardware.

6. A method for identifying novel information, the method comprising: obtaining a classified experience, the classified experience including a set of attributes,
    wherein the experience is a machine proxy for a memory of a user, the experience comprising electronic information about a user experience,
    wherein attributes in the set of attributes are nodes in a graph representing knowledge of the user, links between attributes are co-occurrences of attributes across experiences for the user, wherein the set of attributes is determined by applying a classifier to the electronic information of the experience to produce the set of attributes, the classifier comprising at least one of an artificial neural network, a semantic analysis engine, semantic hashing, or latent semantic analysis;

obtaining memory counts of members of the set of attributes for a user, wherein the memory counts are representative of co-occurrences between attributes;

computing a novelty score for the classified experience by comparing the set of attributes to the memory counts,
wherein comparing the set of attributes to the memory counts includes scoring novelty of links between attributes, and
wherein the novelty of a link from the set of attributes to the memory counts is computed by:
a subtraction of a first co-occurrence from a second co-occurrences; and
a division of the result by the second co-occurrence, where the second co-occurrence is an attribute with a largest value in the memory counts and the first co-occurrence is a value that indicates co-occurrence between another attribute and the attribute with the largest value in the memory counts; and presenting the classified experience to the user when the novelty score meets a qualification criterion.

7. The method of claim 6, wherein the novelty score is computed by:
multiplying fully novel links by a cardinality of the set of attributes to produce a first result;
adding the first result to a sum of memory counts to produce a second result; and
dividing the second result by a maximum possible novelty score.

8. The method of claim 6, comprising identifying the user from a set of users using the set of attributes.

9. The method of claim 8, wherein identifying the user includes:
obtaining an interest profile for the user, the interest profile including a set of topics, a topic in the set of topics including an attribute and a level of interest in the attribute;
sorting the set of users based on the level of interest in attributes contained in the set of attributes; and
selecting users with a level of interest beyond a threshold.

10. The method of claim 6, wherein presenting the classified experience includes providing a synopsis of novel elements of the experience with respect to the user.

11. At least one non-transitory machine readable medium including instructions for identifying novel information, the instructions, when executed by processing circuitry, cause the processing circuitry to perform operations comprising:
obtaining a classified experience, the classified experience including a set of attributes,
wherein the experience is a machine proxy for a memory of a user, the experience comprising electronic information about a user experience,
wherein attributes in the set of attributes are nodes in a graph representing knowledge of the user, links between attributes are co-occurrences of attributes across experiences for the user,
wherein the set of attributes is determined by applying a classifier to the electronic information of the experience to produce the set of attributes, the classifier comprising at least one of an artificial neural network, a semantic analysis engine, semantic hashing, or latent semantic analysis;

obtaining memory counts of members of the set of attributes for a user, wherein the memory counts are representative of co-occurrences between attributes;

computing a novelty score for the classified experience by comparing the set of attributes to the memory counts,
wherein comparing the set of attributes to the memory counts includes scoring novelty of links between attributes, and
wherein the novelty of a link from the set of attributes to the memory counts is computed by:
a subtraction of a first co-occurrence from a second co-occurrences; and
a division of the result by the second co-occurrence, where the second co-occurrence is an attribute with a largest value in the memory counts and the first co-occurrence is a value that indicates co-occurrence between another attribute and the attribute with the largest value in the memory counts; and presenting the classified experience to the user when the novelty score meets a qualification criterion.

12. The at least one non-transitory machine readable medium of claim 11, wherein the novelty score is computed by:
multiplying fully novel links by a cardinality of the set of attributes to produce a first result;
adding the first result to a sum of memory counts to produce a second result; and
dividing the second result by a maximum possible novelty score.

13. The at least one non-transitory machine readable medium of claim 11, wherein the operations comprise identifying the user from a set of users using the set of attributes.

14. The at least one non-transitory machine readable medium of claim 13, wherein identifying the user includes:
obtaining an interest profile for the user, the interest profile including a set of topics, a topic in the set of topics including an attribute and a level of interest in the attribute;
sorting the set of users based on the level of interest in attributes contained in the set of attributes; and
selecting users with a level of interest beyond a threshold.

15. The at least one non-transitory machine readable medium of claim 11, wherein presenting the classified experience includes providing a synopsis of novel elements of the experience with respect to the user.

16. The system of claim 1, wherein the comparison of the set of attributes to the memory counts includes an identification of attributes in the set of attributes for which there is no corresponding memory score.

17. The system of claim 16, wherein the novelty score is a function of a number of attributes in the set of attributes for which there is a corresponding memory count.

18. The system of claim 3, wherein, to identify the user, the controller is to:
obtain an interest profile for the user, the interest profile including a set of topics, a topic in the set of topics including an attribute and a level of interest in the attribute;
sort the set of users based on the level of interest in attributes contained in the set of attributes; and
select users with a level of interest beyond a threshold.

19. The method of claim 6, wherein comparing the set of attributes to the memory counts includes identifying attributes in the set of attributes for which there is no corresponding memory score.

20. The method of claim 19, wherein the novelty score is a function of a number of attributes in the set of attributes for which there is a corresponding memory count.

21. The method of claim 9, wherein selecting the users with a level of interest beyond the threshold includes adding an interest level for each attribute in the set of attributes.

22. The at least one non-transitory machine readable medium of claim 11, wherein comparing the set of attributes to the memory counts includes identifying attributes in the set of attributes for which there is no corresponding memory score.

23. The at least one non-transitory machine readable medium of claim 22, wherein the novelty score is a function of a number of attributes in the set of attributes for which there is a corresponding memory count.

24. The at least one machine readable medium of claim 14, wherein selecting the users with the level of interest beyond the threshold includes excluding users that have a level of interest in only one attribute.

\* \* \* \* \*

UNITED STATES PATENT AND TRADEMARK OFFICE
CERTIFICATE OF CORRECTION

PATENT NO. : 10,685,182 B2  
APPLICATION NO. : 15/425670  
DATED : June 16, 2020  
INVENTOR(S) : Ashrafi et al.

Page 1 of 1

It is certified that error appears in the above-identified patent and that said Letters Patent is hereby corrected as shown below:

In the Claims

In Column 16, Line 32, in Claim 1, delete "co-occurrences;" and insert --co-occurrence;-- therefor In Column 16, Line 61, in Claim 6, after "comprising:", insert --¶--

In Column 17, Line 20, in Claim 6, delete "co-occurrences;" and insert --co-occurrence;-- therefor In Column 18, Line 15, in Claim 11, delete "co-occurrences;" and insert --co-occurrence;-- therefor Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*